(12) United States Patent
Branson et al.

(10) Patent No.: US 8,703,665 B2
(45) Date of Patent: Apr. 22, 2014

(54) MATERIALS COMPRISING DEAGGREGATED DIAMOND NANOPARTICLES

(75) Inventors: Blake T. Branson, Irving, TX (US); Charles M. Lukehart, Nashville, TN (US); Jim L. Davidson, Brentwood, TN (US)

(73) Assignee: Vanderbilt University, Nashville, TN (US)

( * ) Notice: Subject to any disclaimer, the term of this patent is extended or adjusted under 35 U.S.C. 154(b) by 326 days.

(21) Appl. No.: 13/005,295

(22) Filed: Jan. 12, 2011

(65) Prior Publication Data
US 2011/0172132 A1      Jul. 14, 2011

Related U.S. Application Data

(60) Provisional application No. 61/294,335, filed on Jan. 12, 2010.

(51) Int. Cl.
| | |
|---|---|
| *C10M 169/04* | (2006.01) |
| *C01B 31/00* | (2006.01) |
| *C09K 5/00* | (2006.01) |
| *B32B 9/00* | (2006.01) |

(52) U.S. Cl.
USPC ............ 508/113; 423/414; 252/74; 428/402; 977/773

(58) Field of Classification Search
USPC .......... 508/126, 130, 113; 423/415.1; 252/74, 252/78.3, 71; 428/402; 977/773
See application file for complete search history.

(56) References Cited

U.S. PATENT DOCUMENTS

| | | |
|---|---|---|
| 6,858,157 B2 | 2/2005 | Davidson et al. |
| 7,300,958 B2 | 11/2007 | Kataoka et al. |
| 7,390,428 B2 | 6/2008 | Davidson et al. |
| 7,994,105 B2 | 8/2011 | Narayan |
| 7,994,234 B2 | 8/2011 | Lukehart et al. |
| 8,172,916 B2 | 5/2012 | Fujimura et al. |
| 2008/0248979 A1 | 10/2008 | Nakagawa et al. |
| 2009/0042751 A1 | 2/2009 | Narayan |
| 2010/0029518 A1 | 2/2010 | Markovitz et al. |
| 2012/0032543 A1 | 2/2012 | Chakraborty et al. |
| 2012/0122743 A1 | 5/2012 | Ivanov et al. |

OTHER PUBLICATIONS

Barnard, "Self-assembly in nanodiamond agglutinates," Journal of Materials Chemistry, 2008, vol. 18, pp. 4038-4041.
Behler et al., "Nanodiamond-Polymer Composite Fibers and Coatings," ACS Nano, 2009, vol. 3, No. 2, pp. 363-369.
Branson et al., "Aggregated and Dispersed Nanodiamond Composites," 10th Annual Nanoscience and Nanotechnology Forum, Vanderbilt Institute of Nanoscale Science and Engineering, Nov. 4, 2009.
Branson et al, "Synthesis and Characterization of Nanodiamond-Polymer Composites," Nanotech Conference and Expo, Houston, TX., May 2009.
Choi, "Nanofluids: From Vision to Reality Through Research," Journal of Heat Transfer, Mar. 2009, vol. 131, 0331061-0331069.

(Continued)

*Primary Examiner* — Prem Singh
*Assistant Examiner* — Vishal Vasisth
(74) *Attorney, Agent, or Firm* — Michael Best & Friedrich LLP

(57) ABSTRACT

Heat-transfer fluids and lubricating fluids comprising deaggregated diamond nanoparticles are described herein. Also described are composites comprising deaggregated diamond nanoparticles, and methods of making such composites. Method of using deaggregated diamond nanoparticles, for example, to improve the properties of materials such as thermal conductivity and lubricity are also disclosed.

23 Claims, 12 Drawing Sheets

(56) References Cited

OTHER PUBLICATIONS

Eidelman et al., "A stable suspension of single ultrananocrystalline diamond particles," Diamond & Related Materials, 2005, vol. 14, pp. 1765-1769.

Goyal et al., "Microhardness of PEEK/ceramic micro- and nanocomposites: Correlation with Halpin—Tsai model,"Materials Science and Engineering A, 2008, vol. 491, pp. 230-236.

Holt, "Diamond at the nanoscale: applications of diamond nanoparticles from cellular biomarkers to quantum computing," Phil. Trans. R. Soc. A, 2007, 365, 2845-2861.

Hsin et al., "In situ de-agglomeration and surface functionalization of detonation nanodiamond, with the polymer used as an additive in lubricant oil," J. Mater. Chem., 2011, vol. 21, pp. 13213-13222.

Kavan et al., "Interaction of nanodiamond with in situ generated sp-carbon chains probed by Raman spectroscopy," Carbon, 2006, vol. 44, pp. 3113-3116.

Krueger, "Diamond Nanoparticles: Jewels for Chemistry and Physics," Adv. Mater., 2008, vol. 20, pp. 2445-2449.

Krueger, "The structure and reactivity of nanoscale diamond," J. Mater. Chem., 2008, vol. 18, pp. 1485-1492.

Krueger et al., "Deagglomeration and functionalisation of detonation diamond," Phys. Stat. Sol. (a), 2007, vol. 204, No. 9, pp. 2881-2887.

Krueger et al., "Deagglomeration and functionalisation of detonation nanodiamond with long alkyl chains," Diamond & Related Materials, 2008, vol. 17, pp. 1367-1370.

Krueger et al., "Biotinylated Nanodiamond: Simple and Efficient Functionalisation of Detonation Diamond," Langmuir 2008, 24, 4200-4204, plus supporting information (7 pages).

Krüger et al., "Unusually tight aggregation in detonation nanodiamond: Identification and disintegration," Carbon , 2005, vol. 43, pp. 1722-1730.

Krüger et al., "Surface functionalisation of detonation diamond suitable for biological applications," J. Mater. Chem., 2006, vol. 16, pp. 2322-2328.

Lee et al., "Understanding the Role of Nanoparticles in Nano-oil Lubrication," Tribol Lett, 2009, vol. 35, pp. 127-131.

Li et al., "Surface functionalization of nanodiamond particles via atom transfer radical polymerization," Carbon, 2006, vol. 44, pp. 2308-2315.

Liang et al., A General Procedure to Functionalize Agglomerating Nanoparticles Demonstrated on Nanodiamond, ACS Nano, 2009, 3(8), pp. 2288-2296.

Mochalin et al., Wet Chemistry Route to Hydrophobic Blue Fluorescent Nanodiamond, J. Am. Chem. Soc., 2009, vol. 131, pp. 4594-4595.

Monteiro et al., "Structure and mechanical properties of composites with diamond particles dispersed into modified epoxy matrix," Diamond & Related Materials, 2007, vol. 16, pp. 974-977.

Morita et al., "A Facile and Scalable Process for Size-Controllable Separation of Nanodiamond Particles as Small as 4 nm," Small, 2008, vol. 4, No. 12, pp. 2154-2157.

Ōsawa, "Recent progress and perspectives in single-digit nanodiamond," Diamond & Related Materials, 2007, 16, pp. 2018-2022.

Ōsawa, "Monodisperse single nanodiamond particulates," Pure Appl. Chem., 2008, vol. 80, No. 7, pp. 1365-1379.

Ozawa, "Preparation and Behavior of Brownish, Clear Nanodiamond Colloids," Adv. Mater., 2007, vol. 19, pp. 1201-1206.

Shenderova et al., "Carbon Nanostructures," Critical Reviews in Solid State and Materials Sciences, 2002, vol. 27, pp. 227-356.

Shenderova et al., "Nanodiamond and onion-like carbon polymer nanocomposites," Diamond & Related Materials, 2007, vol. 16, pp. 1213-1217.

Sreekumar et al., "Oxidative stabilization of polyacrylonitrile in the presence of functionalized carbon nanotubes," Letters to the Editor / Carbon, 2007, vol. 45, pp. 1114-1116.

Tao et al., "The ball-bearing effect of diamond nanoparticles as an oil additive," J. Phys. D: Appl. Phys., 1996, vol. 29, pp. 2932-2937.

Torii et al., "Heat Transfer Augmentation of Aqueous Suspensions of Nanodiamonds in Turbulent Pipe Flow," Journal of Heat Transfer, Apr. 2009, vol. 131, 5 pages.

Tyler et al., "Thermal transport properties of diamond-based nanofluids and nanocomposites," Diamond & Related Materials, 2006, vol. 15, pp. 2078-2081.

Verma et al., "Tribological Behavior of Deagglomerated Active Inorganic Nanoparticles for Advanced Lubrication," Tribology Transactions, 2008, vol. 51, pp. 673-678.

Wang et al., "In-Situ Nanocomposite Synthesis: Arylcarbonylation and Grafting of Primary Diamond Nanoparticles with a Poly(etherketone) in Polyphosphoric Acid," Macromolecules, 2009, vol. 42, pp. 114-124.

Xie et al., "Thermal performance enhancement in nanofluids containing diamond nanoparticles," J. Phys. D: Appl. Phys., 2009, vol. 42, 5 pages.

Xu et al., "Influence of surface modification adopting thermal treatments on dispersion of detonation nanodiamond," Journal of Solid State Chemistry, 2005, vol. 178, pp. 688-693.

Xuan et al., "Heat transfer enhancement of nanofluids," International Journal of Heat and Fluid Flow, 2000, vol. 21, pp. 58-64.

Jiang et al., "FTIR Study of Ultradispersed Diamond Powder Synthesized by Explosive Detonation," Carbon vol. 33, No. 12, pp. 1663-1671,1995.

Xu et al., "A new method for deaggregation of nanodiamond from explosive detonation: graphitization-oxidation method," Physics of the Solid State Apr. 2004, vol. 46, Issue 4, pp. 649-650.

Zhu et al., "Chemical mechanical modification of nanodiamond in aqueous system," Physics of the Solid State Apr. 2004, vol. 46, Issue 4, pp. 681-684.

MATERIALS COMPRISING DEAGGREGATED DIAMOND NANOPARTICLES

CROSS-REFERENCE TO RELATED APPLICATIONS

This application claims priority to U.S. Provisional Application No. 61/294,335, filed on Jan. 12, 2010, the disclosure of which is incorporated by reference herein in its entirety.

STATEMENT REGARDING FEDERALLY FUNDED RESEARCH

This invention was made with U.S. government support under the NSF IGERT Program at Vanderbilt University, as Grant No. DGE-0333392 awarded by the National Science Foundation, as well as Grant No. W911 NF-04-2-0023, awarded by the Army Research Office. The U.S. government has certain rights in the invention.

SUMMARY

The invention provides, among other things, a heat-transfer fluid comprising deaggregated diamond nanoparticles. The deaggregated diamond nanoparticles may be surface functionalized or oxidized. The heat-transfer fluid may additionally comprise water, ethylene glycol, mineral oil, dimethyl polysiloxane, a biphenol, a triphenol, or a combination thereof. The heat-transfer fluid may comprise greater than about 1% (wt/wt), or greater than about 3% (wt/wt) deaggregated diamond nanoparticles. The heat-transfer fluid may be shelf-stable for at least about 30 days or at least about 90 days.

The invention additionally provides, among other things, a lubricating fluid comprising deaggregated diamond nanoparticles. The deaggregated diamond nanoparticles may be surface functionalized or oxidized. The lubricating fluid may additionally comprise ethylene glycol, mineral oil, dimethyl polysiloxane, hydrocarbons, or a combination thereof. The lubricating fluid may comprise greater than about 1% (wt/wt), or greater than about 3% (wt/wt) deaggregated diamond nanoparticles. The lubricating fluid may be shelf-stable for at least about 30 days or at least about 90 days.

The invention additionally provides, among other things, a method of improving the mechanical properties of a material, comprising contacting the material with deaggregated diamond nanoparticles. For example, the method may comprise incorporating the deaggregated diamond nanoparticles into the material. The mechanical properties of the material may be improved compared to the same material without the deaggregated diamond nanoparticles. The deaggregated diamond nanoparticles may be surface functionalized or oxidized. The mechanical property that is improved (e.g., increased or decreased) may be modulus of elasticity, tensile strength, hardness, flexure, compressibility, chemical resistivity, thermal degradation, thermal conductivity, heat capacity or lubricity. The material may be, but need not be limited to, a polymer, or a heat-transfer fluid, or a lubricant. The polymer may comprise at least one of an amide, an acrylonitrile, an acetate, a bismaleimide, a butylene, a butadiene, a carbonate, an ethylene, an ester, an epoxy, a methacrylate, a (methyl)methacrylate, a styrene, a terephthalate, a urethane, and a combination thereof.

The invention additionally provides, among other things, a method of increasing the thermal conductivity of a fluid, comprising incorporating deaggregated diamond nanoparticles into the fluid. The deaggregated diamond nanoparticles may be surface-functionalized or oxidized. The thermal conductivity of the fluid may be increased by at least about 1%, at least about 2%, at least about 3%, at least about 4%, at least about 5%, at least about 10%, at least about 15%, at least about 20%, at least about 25%, at least about 30%, at least about 35%, at least about 40%, at least about 45%, or at least about 50% compared to the same fluid without deaggregated diamond nanoparticles. The thermal conductivity of the fluid may be increased by up to about 1%, up to about 2%, up to about 3%, up to about 4%, up to about 5%, up to about 10%, up to about 15%, up to about 20%, up to about 25%, up to about 30%, up to about 35%, up to about 40%, up to about 45%, or up to about 50% compared to the same fluid without deaggregated diamond nanoparticles.

The invention additionally provides, among other things, a method of increasing the lubricity of a fluid, comprising incorporating deaggregated diamond nanoparticles into the fluid. The deaggregated diamond nanoparticles may be surface-functionalized or oxidized. The coefficient of friction of the fluid may be reduced by at least about 1%, at least about 2%, at least about 3%, at least about 4%, at least about 5%, at least about 10%, at least about 15%, at least about 20%, at least about 25%, at least about 30%, at least about 35%, at least about 40%, at least about 45%, or at least about 50% compared to the same fluid without deaggregated diamond nanoparticles. The coefficient of friction of the fluid may be reduced by up to about 1%, up to about 2%, up to about 3%, up to about 4%, up to about 5%, up to about 10%, up to about 15%, up to about 20%, up to about 25%, up to about 30%, up to about 35%, up to about 40%, up to about 45%, or up to about 50% compared to the same fluid without deaggregated diamond nanoparticles. The coefficient of friction of the fluid may be reduced by about 10-50% compared to the same fluid without deaggregated diamond nanoparticles. The wear rate of the fluid may be reduced by at least about 1%, at least about 2%, at least about 3%, at least about 4%, at least about 5%, at least about 10%, at least about 15%, at least about 20%, at least about 25%, at least about 30%, at least about 35%, at least about 40%, at least about 45%, or at least about 50% compared to the same fluid without deaggregated diamond nanoparticles. The wear rate of the fluid may be reduced by up to about 1%, up to about 2%, up to about 3%, up to about 4%, up to about 5%, up to about 10%, up to about 15%, up to about 20%, up to about 25%, up to about 30%, up to about 35%, up to about 40%, up to about 45%, or up to about 50% compared to the same fluid without deaggregated diamond nanoparticles. The wear rate of the fluid may be reduced by about 5-50% compared to the same fluid without deaggregated diamond nanoparticles. The seizure load of the fluid may be increased by at least about 1%, at least about 2%, at least about 3%, at least about 4%, at least about 5%, at least about 10%, at least about 15%, at least about 20%, at least about 25%, at least about 30%, at least about 35%, at least about 40%, at least about 45%, at least about 50%, at least about 55%, or at least about 60% compared to the same fluid without deaggregated diamond nanoparticles. The seizure load of the fluid may be increased by up to about 1%, up to about 2%, up to about 3%, up to about 4%, up to about 5%, up to about 10%, up to about 15%, up to about 20%, up to about 25%, up to about 30%, up to about 35%, up to about 40%, up to about 45%, up to about 50%, up to about 55%, or up to about 60% compared to the same fluid without deaggregated diamond nanoparticles. The seizure load of the fluid may be increased by about 10-60% compared to the same fluid without deaggregated diamond nanoparticles.

The invention additionally provides, among other things, a composite comprising deaggregated diamond nanoparticles, the deaggregated diamond nanoparticles having an average particle size of less than about 10 nm. The deaggregated diamond nanoparticles may have an average particle size less than about 8 nm, or less than about 5 nm. The deaggregated diamond nanoparticles may be surface functionalized or oxidized. For example, the deaggregated diamond nanoparticles may be surface-functionalized with at least one of an oligomer, a polymer, a surfactant, a functional group, and a combination thereof. The composite may comprise a polymer, such as a thermoplastic polymer. The polymer may comprise at least one of an amide, an acrylonitrile, an acetate, a bismaleimide, a butylene, a butadiene, a carbonate, an ethylene, an ester, an epoxy, a methacrylate, a (methyl)methacrylate, a styrene, a terephthalate, a urethane, and a combination thereof. The composite may comprise cross-linkers or moieties capable of cross-linking. The composite may also comprise a reinforcing fiber, such as a reinforcing fiber comprising at least one of glass, aramid, silica, silicon oxide, carbon, silicon nitride, boron nitride, and a combination thereof. The composite may comprise greater than about 1% wt/wt deaggregated diamond nanoparticles (e.g., greater than about 8% wt/wt deaggregated diamond nanoparticles).

The invention additionally provides, among other things, a method of making a deaggregated diamond nanoparticle composite, the method comprising contacting deaggregated diamond nanoparticles with a polymer to make a composite mixture, forming the composite mixture into an article, and curing the composite mixture to make the deaggregated diamond nanoparticle composite. Contacting may include, but need not be limited to, covalent or non-covalent binding of surface moieties on deaggregated diamond nanoparticles to other molecular fragments, reactive linker molecules, oligomers, or polymers. Forming may include, but need not be limited to, casting, injection molding, thermosetting, thermoforming, blow molding, or filament winding. Curing may include, but need not be limited to drying, heating, evacuating, flashing, or exposure to ultraviolet light. The deaggregated diamond nanoparticles may be surface functionalized or oxidized. The polymer may comprise at least one of an amide, an acrylonitrile, an acetate, a bismaleimide, a butylene, a butadiene, a carbonate, an ethylene, an ester, an epoxy, a methacrylate, a (methyl)methacrylate, a styrene, a terephthalate, a urethane, and a combination thereof. The composite may comprise cross-linkers or moieties capable of cross-linking. The composite may also comprise a reinforcing fiber comprising at least one of glass, aramid, silica, silicon oxide, carbon, silicon nitride, boron nitride, and a combination thereof. The composite may comprise greater than about 1% wt/wt deaggregated diamond nanoparticles (e.g., greater than about 8% wt/wt deaggregated diamond nanoparticles). The method may further comprise deaggregating ultradispersed diamond to create deaggregated diamond nanoparticles.

The invention additionally provides, among other things, a method of making a deaggregated diamond nanoparticle composite, the method comprising contacting aggregated diamond nanoparticles with a polymer to make an aggregated diamond nanoparticle-composite mixture, deaggregating the diamond nanoparticles in the aggregated diamond nanoparticle-composite mixture, forming the composite mixture into an article, and curing the composite mixture to make the deaggregated diamond nanoparticle composite. Contacting may include, but need not be limited to, covalent or non-covalent binding of surface moieties on deaggregated diamond nanoparticles to other molecular fragments, reactive linker molecules, oligomers, or polymers. Forming may include, but need not be limited to, casting, injection molding, thermosetting, thermoforming, blow molding, or filament winding. Curing may include, but need not be limited to drying, heating, evacuating, flashing, or exposure to ultraviolet light. The deaggregated diamond nanoparticles may be surface functionalized or oxidized. The polymer may comprise at least one of an amide, an acrylonitrile, an acetate, a bismaleimide, a butylene, a butadiene, a carbonate, an ethylene, an ester, an epoxy, a methacrylate, a (methyl)methacrylate, a styrene, a terephthalate, a urethane, and a combination thereof. The composite may comprise cross-linkers or moieties capable of cross-linking. The composite may also comprise a reinforcing fiber comprising at least one of glass, aramid, silica, silicon oxide, carbon, silicon nitride, boron nitride, and a combination thereof. The composite may comprise greater than about 1% wt/wt deaggregated diamond nanoparticles (e.g., greater than about 8% wt/wt deaggregated diamond nanoparticles).

The invention additionally provides, among other things, a method of making a thermoplastic deaggregated diamond nanoparticle composite, the method comprising contacting a monomer mixture comprising thermoplastic monomers with deaggregated diamond nanoparticles and polymerizing at least some of the monomers in the monomer mixture to make a thermoplastic deaggregated diamond nanoparticle composite. The deaggregated diamond nanoparticles may be surface functionalized or oxidized. The polymer may comprise at least one of an amide, an acrylonitrile, an acetate, a bismaleimide, a butylene, a butadiene, a carbonate, an ethylene, an ester, an epoxy, a methacrylate, a (methyl)methacrylate, a styrene, a terephthalate, a urethane, and a combination thereof. The composite may comprise cross-linkers or moieties capable of cross-linking. The composite may also comprise a reinforcing fiber comprising at least one of glass, aramid, silica, silicon oxide, carbon, silicon nitride, boron nitride, and a combination thereof. The composite may comprise greater than about 1% wt/wt deaggregated diamond nanoparticles (e.g., greater than about 8% wt/wt deaggregated diamond nanoparticles).

The invention additionally provides, among other things, a method of manufacturing an article comprising incorporating deaggregated diamond nanoparticles into the article. The article may be body armor, an aircraft, a bicycle, a boat, a container, a computer, a golf club, a tennis racket, a turbine blade, a railcar, a surfboard, a skateboard, a fishing rod, a building material, a tube, a pipe, a bat, a snowboard, a ski, a wakeboard, a motor vehicle, or a trailer.

Other aspects of the invention will become apparent by consideration of the detailed description and accompanying drawings.

DETAILED DESCRIPTION

Figure 1:
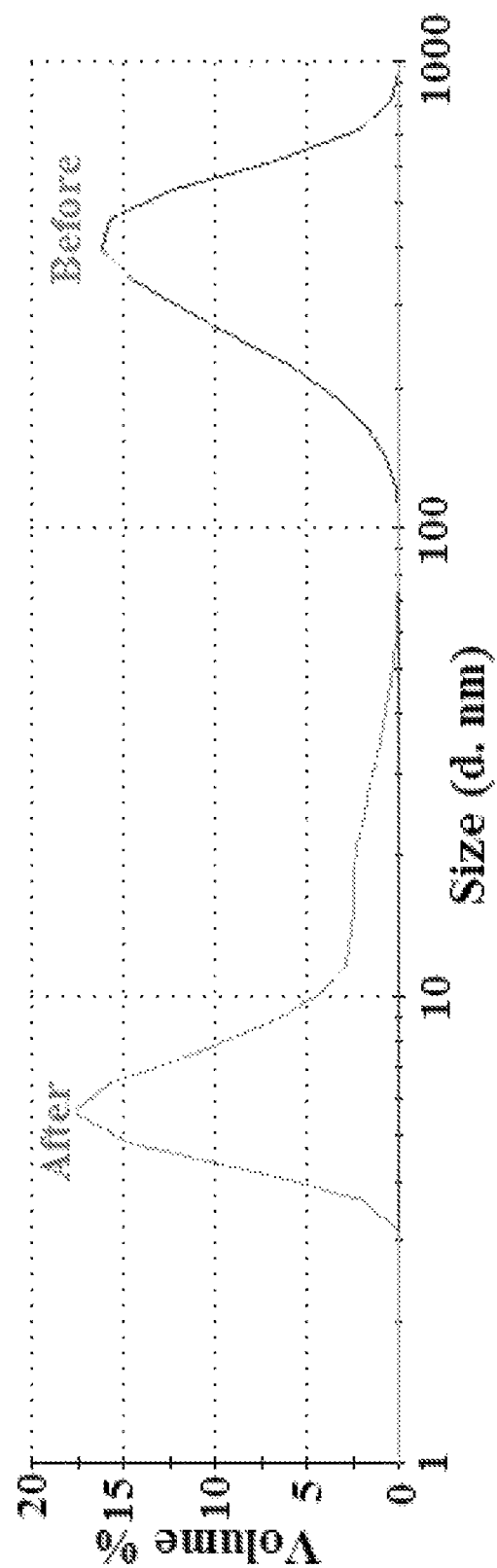
FIG. 1 shows average particle size measurements for oxidized deaggregated (a) and oxidized aggregated (b) diamond nanoparticles.

Detonation nanodiamonds are formed by detonating carbon explosives in a chamber capable of withstanding the heat and pressure produced during the detonation. After detonation, the remnants are chemically and mechanically treated to separate out the nanodiamond material. The resultant nanodiamonds form aggregates, tens to thousands of nanometers in diameter, that are very difficult to separate. The aggregates, known as Ultra-Disperse Diamond (UDD) are available commercially from suppliers such as ALIT Corp. (Kiev, Ukraine).

Incorporating nanodiamonds into solid and liquid matrices is expected to have profound effects on the mechanical properties of the resulting composites. Polymer composites comprising nanodiamond may improve at least one of the stiffness, strength, toughness, ductility, and scratch/wear-resistance when compared to the polymer alone. Furthermore, incorporating nanodiamonds could improve the polymer's chemical resistance and thermal stability. These features should make nanodiamond composites attractive materials for high-performance, lightweight composites, especially for use in automotive, aerospace, and marine applications.

Additionally, diamond has the highest isotropic thermal conductivity of any known material. Therefore, incorporating nanodiamonds into fluid systems should result in significant increases in thermal conductivity. For example, adding nanodiamonds to a cooling fluid should improve the fluid's ability to absorb or dissipate heat, increasing the efficiency of the thermal management system containing the fluid. Nanodiamonds are also expected to also improve a lubricating fluid's functionality by reducing the coefficient of friction, increasing the seizure load, and reducing the wear of the contact surfaces.

Overall, UDD solid and liquid composites have not produced the benefits that were anticipated from the incorporation of detonation nanodiamonds. For example, UDD composites have been shown to cause polymer matrices to become brittle and fail at much lower strains than the unfilled polymer host. Additionally, incorporating UDD particles into liquid phase media has proved difficult, resulting in few applications of UDD liquid-phase composites. The UDD particles are too large to stay mixed in a true solution without substantial surface modification, and in many cases, the UDD particles can (at best) be incorporated into suspensions with relatively short life times, e.g., a few days. Some (though not all) previous reports of UDD/liquid systems require a mass of dispersant that approaches or exceeds the mass of the UDD. In many instances this detrimental characteristic of UDD has hindered diamond's incorporation into composite systems.

UDD aggregates do not break apart during purification processes or under conventional dispersion techniques such as ultrasonication or ball milling. Until recently, it was believed that the "core aggregates" of the UDD were uncrushable. Consequently most of the composites or fluid mixtures reported in literature used UDD, and not deaggregated diamond nanoparticles (a.k.a. ND, deaggregated nanodiamonds). However, it have been recently disclosed that very specific processes, such as stirred media milling with zirconia beads, can be used to de-aggregate the diamond nanoparticles to form deaggregated diamond nanoparticles. See, e.g., Wang et al., *Macromolecules* (2009), vol. 42, 114-124, incorporated herein by reference in its entirety.

Composites and nanofluids comprising deaggregated diamond nanoparticles (ND) display marked differences from composites and nanofluids comprising ultra-disperse diamond aggregates (UDD), however. For solid composites, incorporating well-dispersed ND results in superior mechanical properties. For example, the ND composites have greater hardness and tensile strength when compared to UDD composites using the same matrix and having the same weight % of nanoparticles. While not wishing to be bound by theory, it is hypothesized that the ND particles are more efficient at reinforcing the matrix than the UDD particles because of the additional surface area available when the primary diamond nanoparticles are well-dispersed. A second, substantial reason that ND outperforms UDD at a given concentration is that the particle-polymer interface can be made very strong through proper functionalization leading to covalent or non-covalent binding across the ND/polymer interface. The particle-particle interface present in UDD composites is, by contrast, defective and an initiation point for cracks/voids. Furthermore, there is evidence that well-dispersed ND composites allow the polymer matrix to strain more than the unmodified polymer matrix, increasing the toughness of the material.

Fluids incorporating ND offer many advantages over the neat fluids, e.g., increased thermal conductivity and/or increased lubricity. However, fluids incorporating ND do not appear to have the draw backs of fluids containing UDD. While not wishing to be bound by theory, it is hypothesized that the difference is primarily due to the ND particles' ability to remain in solution indefinitely, whereas the UDD particles cannot. Additionally, fluids incorporating ND do not appear to experience detrimental changes in viscosity, in contrast to corresponding UDD-containing fluids. This feature is especially important in the case of liquid resins, such as epoxy or vinyl esters, wherein a significant increase in viscosity would prevent the use of resin transfer fabrication techniques and would reduce (or remove completely) the utility of incorporating the nanoparticles into the resins. Furthermore, in lubricating and cooling fluids, increased viscosity requires additional pumping power, in some cases offsetting the gains realized by an increase in thermal conductivity.

The invention provides a composite comprising deaggregated diamond nanoparticles, the deaggregated diamond nanoparticles having an average particle size of less than about 10 nm. The deaggregated diamond nanoparticles may have an average particle size less than about 9 nm, less than about 8 nm, less than about 7 nm, less than about 6 nm, or less than about 5 nm. The inclusion of deaggregated diamond nanoparticles results in the composites having at least one of improved (e.g., increased or decreased) modulus of elasticity, tensile strength, hardness, flexure, compressibility, chemical resistivity, thermal degradation, thermal conductivity, heat capacity or lubricity when compared to the matrix material alone (e.g., the composite material surrounding the deaggregated diamond nanoparticles). The composites comprise greater than about 0.01% (wt/wt), typically greater than about 0.1% (wt/wt), more typically greater than about 1% (wt/wt) deaggregated diamond nanoparticles.

Because of the high strength to weight ratios obtained by composites of the invention, composites of the invention may be useful in many articles of manufacture including, but not limited to, body armor, aircraft, and aircraft engines, spacecraft, bicycles, boats, ships, containers, computers, golf clubs, tennis rackets, wind turbine blades, railcars, surfboards, skateboards, fishing rods, building materials, tubes, pipes, bats, snowboards, skis, wakeboards, motor vehicles, farm implements, and trailers. Motor vehicles include, but need not be limited to, automobiles, motorcycles, busses, locomotives, semi trucks, construction equipment, off-road vehicles, and motorized farm equipment. In the case of load-bearing applications, the composites allow manufacturers to design parts that can carry the same load with significantly less mass, or that carry higher loads with the same mass. For motor vehicles, such modifications result in reducing power requirements, improving fuel economy and improving payload capacity. The composites also allow the fabrication of sporting equipment that is stiffer (giving better efficiency) and stronger (less likely to break), but at no added weight. These same characteristics are valuable in high strain environments such as turbine blades and aircraft flight surfaces (wings, tails, rotors, etc.). Furthermore, the improved chemical resistance will increase the useful lifetime of composites placed in corrosive or harsh environments.

Composites of the invention may have a modulus of elasticity greater than about 1 GPa, greater than about 3 GPa, greater than about 5 GPa, greater than about 7 GPa, or greater than about 10 GPa when measured using ASTM D 638 with a load table (or a similar test). Composites of the invention may also have a tensile strength greater than about 50 MPa, greater than about 60 MPa, greater than about 70 MPa, or greater than about 80 MPa when measured with a load table. Composites of the invention may be impervious to polar or non-polar solvents. Composites of the invention may show enhanced resistance to chemical attack, such as, but not limited to, exposure to acids, bases, corrosive liquids, or corrosive gasses. Composites of the invention may show enhanced resistance to heat and fire.

In some embodiments the composite additionally comprises polymers. The polymers may include, but need not be limited to, amides, acrylonitriles, acetates, bismaleimides, butylenes, butadienes, carbonates, ethylenes, esters, epoxies, methacrylates, (methyl)methacrylates, styrenes, terephthalates, urethanes, or a combination thereof. The polymers may include other reinforcing materials or fillers, including, but not limited to glasses, aramids, silicas, silicon oxides, carbon products, silicon nitrides, boron nitrides, nanotubes, and combinations thereof. In some embodiments the polymers of a composite may be cross-linked, or the monomers or polymers of the composite may be capable of being cross-linked at a later time. Composites of the invention may comprise greater than about 0.01% (wt/wt), typically greater than 0.1% (wt/wt), more typically greater than 1% (wt/wt) reinforcing materials or fillers.

Composites or fluids of the invention may have a varying amount of deaggregated diamond nanoparticles. Composites of the invention may comprise greater than about 0.01% (wt/wt), greater than about 0.04% (wt/wt), greater than about 0.07% (wt/wt), greater than about 0.1% (wt/wt), greater than about 0.4% (wt/wt), greater than about 0.7% (wt/wt), greater than about 1% (wt/wt), greater than about 4% (wt/wt), greater than about 7% (wt/wt), or greater than 10% (wt/wt) deaggregated diamond nanoparticles. Fluids of the invention may comprise greater than about 0.01% (wt/wt), greater than about 0.04% (wt/wt), greater than about 0.07% (wt/wt), greater than about 0.1% (wt/wt), greater than about 0.4% (wt/wt), greater than about 0.7% (wt/wt), greater than about 1% (wt/wt), greater than about 4% (wt/wt), greater than about 7% (wt/wt), or greater than about 10% (wt/wt) deaggregated diamond nanoparticles. The deaggregated diamond nanoparticles included in composites or fluids of the invention may be surface functionalized by oxidizing the surface to create carboxyl groups, or by adding one or more additional chemical moieties, including polymers oligomers, surfactants, reactive molecular moieties, or other functional groups.

Composites of the invention may be formed into articles through a variety of processes known to those of skill in the art of composites. For example, composites of the invention may be formed by casting, injection molding, thermosetting, thermoforming, blow molding, or filament winding a mixture comprising a polymer, or a monomer, and deaggregated diamond nanoparticles. In some embodiments, the composite will require curing prior to commercial use. Curing may include, but need not be limited to, drying, heating, evacuating, flashing, or exposure to ultraviolet light. In some embodiments, deaggregated diamond nanoparticles are contacted with a polymer or a monomer prior to forming. Contacting may include, but need not be limited to, covalent or non-covalent binding of surface moieties on deaggregated diamond nanoparticles to other molecular fragments, reactive linker molecules, oligomers, or polymers. In other embodiments, aggregated diamond nanoparticles are contacted with a polymer or a monomer prior to forming to make a mixture of aggregated diamond nanoparticles and polymer or a monomer, and then the mixture of aggregated diamond nanoparticles and polymer or a monomer is mechanically treated to deaggregate the diamond nanoparticles.

The invention additionally provides heat-transfer fluids comprising deaggregated diamond nanoparticles. The heat-transfer fluids may additionally comprise at least one of water, ethylene glycols, mineral oils, dimethyl polysiloxanes, biphenols, triphenols, and combinations thereof. The inclusion of deaggregated diamond nanoparticles increase the heat capacity of the heat-transfer fluid by at least about 1%, typically about 5%, more typically about 10%. Incorporation of deaggregated diamond nanoparticles may increase the thermal conductivity of a heat-transfer fluid by at least about 1%, typically about 5%, more typically about 10%. Because the heat-transfer fluids comprising deaggregated diamond nanoparticles are true solutions, they are shelf stable (do not visibly separate) for at least about 10 days, typically at least about 30 days, more typically at least about 90 days. The heat-transfer fluid may comprise greater than about 1% (wt/wt), or greater than about 3% (wt/wt) deaggregated diamond nanoparticles. The heat-transfer fluids may be useful for cooling industrial processes, power generation, power transmission, propulsion cooling, structure heating, machining, drilling, and cutting, among other applications.

The invention additionally provides lubricating fluids comprising deaggregated diamond nanoparticles. The lubricating fluids may additionally comprise water, ethylene glycol, oil, petroleum, long-chain hydrocarbons, silicones, dimethyl polysiloxanes, and combinations thereof. The inclusion of deaggregated diamond nanoparticles increases the lubricity of the lubricating fluids at least about 1%, typically about 5%, more typically about 10%, as measured with tribological tests such as ASTM F2661. Other parameters that may be used to evaluate lubricity of a fluid include measuring the coefficient of friction, wear rate and seizure load. Because the lubricating fluids comprising deaggregated diamond nanoparticles are true solutions, they are shelf stable (do not visibly separate) for at least about 10 days, typically at least about 30 days, more typically at least about 90 days. The lubricating fluids may comprise greater than about 1% (wt/wt), or greater than about 3% (wt/wt) deaggregated diamond nanoparticles. The lubricating fluids may be useful for lubricating industrial processes, power generation, power transmission, engines, rolling surfaces, machining, drilling, and cutting, among other applications.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any nonclaimed element as essential to the practice of the invention.

It also is understood that any numerical range recited herein includes all values from the lower value to the upper value. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this application.

Further, no admission is made that any reference, including any patent or patent document, cited in this specification constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinency of any of the documents cited herein.

EXAMPLES

Example 1

Oxidized Deaggregated Diamond Nanoparticle DMSO Solution

Ultradisperse diamond powder (UDD) was obtained from a commercial supplier (UDD Powder, ALIT Corporation, Kiev, Ukraine). The commercial powder comprises tightly bound aggregates of detonation nanodiamonds that are tens to thousands of nanometers in size. The commercial UDD was subjected to thermal treatment in an inert atmosphere to convert the surface functional groups into carboxylic acids. The oxidized ultradisperse diamond powder is denoted UDD-COOH. The completion of the carboxylation process was determined by a plateau in the magnitude of the C=O absorption at 1750 cm$^{-1}$ (measured via FTIR) as a function of time for the oxidized UDD samples.

Approximately 5 g of UDD-COOH was mixed with 100 mL of DMSO (Fisher Scientific, Pittsburg, Pa.) and sonicated for 1 hour to create a UDD-COOH slurry. Fifty mL of the UDD-COOH slurry was then agitated with approximately 25 mL of 50 μm zirconia beads (Sigma Aldrich, St. Louis, Mo.) for approximately 30 minutes to deaggregate the UDD-COOH to form deaggregated nanodiamond particles (ND-COOH). After agitation, the supernatant containing the ND-COOH was poured away from the zirconia beads to obtain a 5% ND-COOH/DMSO solution.

Figure 2:
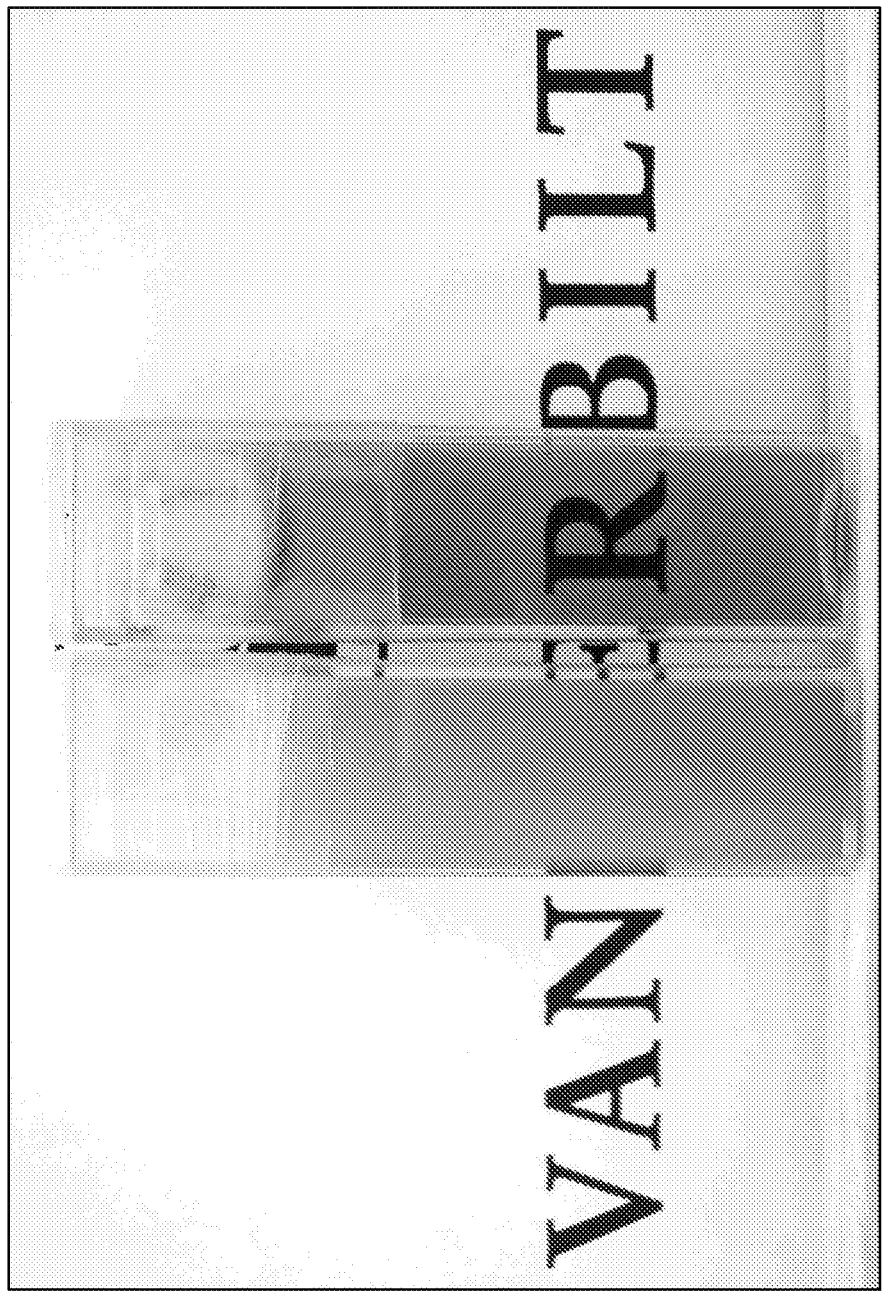
FIG. 2 shows the differences between a slurry of aggregated diamond nanoparticles (left) and a solution of deaggregated diamond nanoparticles (right), both in DMSO.

Portions of the ND-COOH solution and the UDD-COOH slurry were transferred to separate 1 cm×1 cm glass cuvettes (Fisher Scientific, Pittsburg, Pa.) for analysis. Using a dynamic light scattering instrument (ZetaSizer Nano, Malvern Instruments, Malvern, England) the average particle size for the ND-COOH and UDD-COOH mixtures was measured. The ND-COOH solution had an average particle size of approximately 6 nm, and the UDD-COOH solution has an average particle size of approximately 400 nm (see FIG. 1). The difference in particle size was readily apparent from the optical properties of the two solutions. The ND-COOH solution (right) is a transparent brownish red solution, whereas the UDD-COOH slurry is brown and cloudy (left). See FIG. 2. The reddish color of ND-COOH is likely due to Rayleigh scattering by the dispersed diamond nanoparticles, and both the ND-COOH solution and the UDD-COOH slurry have brown tinges due to the oxidized surfaces of the particles. After two weeks of sitting at room temperature, the ND-COOH solution remained a true solution, while the UDD-COOH slurry separated out (not shown).

Example 2

Polyacrylonitrile (PAN) Composite Comprising Deaggregated Diamond Nanoparticles

In a 15 mL centrifuge tube, 1.25 g of polyacrylonitrile (PAN) resin (Scientific Polymer Products, Ontario, N.Y.) was dissolved in 4.75 g DMSO (Fisher Scientific) to create a PAN/DMSO solution. To the PAN/DMSO solution, 6.7 g of the ND-COOH:DMSO solution of EXAMPLE 1 was added to create an ND/PAN mixture. The centrifuge tube was sealed and placed on a rotisserie for two hours to mix. After mixing, the ND/PAN mixture was cast onto a glass plate. The plate was placed in a vacuum oven at 90° C. for 9 hours to drive off solvent. After curing in the oven, the mixture resulted in a composite film approximately 20% by weight ND, dispersed in PAN.

In order to quantify the change in mechanical properties as a function of incorporated nanodiamonds, a series of UDD and ND PAN films, both with, and without oxidative treatment, were prepared with varying % weight of nanodiamond, using the methods above.

In a first series of tests, the role of the COOH groups created by the oxidative treatment was evaluated by collecting nanoindentation data on a series of oxidized ND/PAN, unoxidized ND/PAN, and oxidized UDD/PAN films. Using the methods above, films were prepared with approximately 2%, 3%, 7%, and 13% (v/v) nanodiamond of each respective group. In the case of the unoxidized ND/PAN, the commercial UDD was not subjected to an oxidative treatment prior to the deaggregation treatment and subsequent incorporation into the composite. Each film's elastic modulus was then evaluated using a nanoindentor (NanoIndentor G200, Agilent Technologies, Santa Clara, Calif.). The collected data are shown graphically in FIG. 3; squares=oxidized UDD/PAN, diamonds=oxidized ND/PAN, triangles=unoxidized ND/PAN. The dashed line represents the theoretical results using adjusted Halpin-Tsai equations, assuming the nanoparticles are non-interacting spherical particles, each having a Young's modulus of 1 TPa. See, Goyal et al., *Materials Science and Engineering A*, vol. 491, (2008) 230-236, incorporated herein by reference in its entirety.

Figure 3:
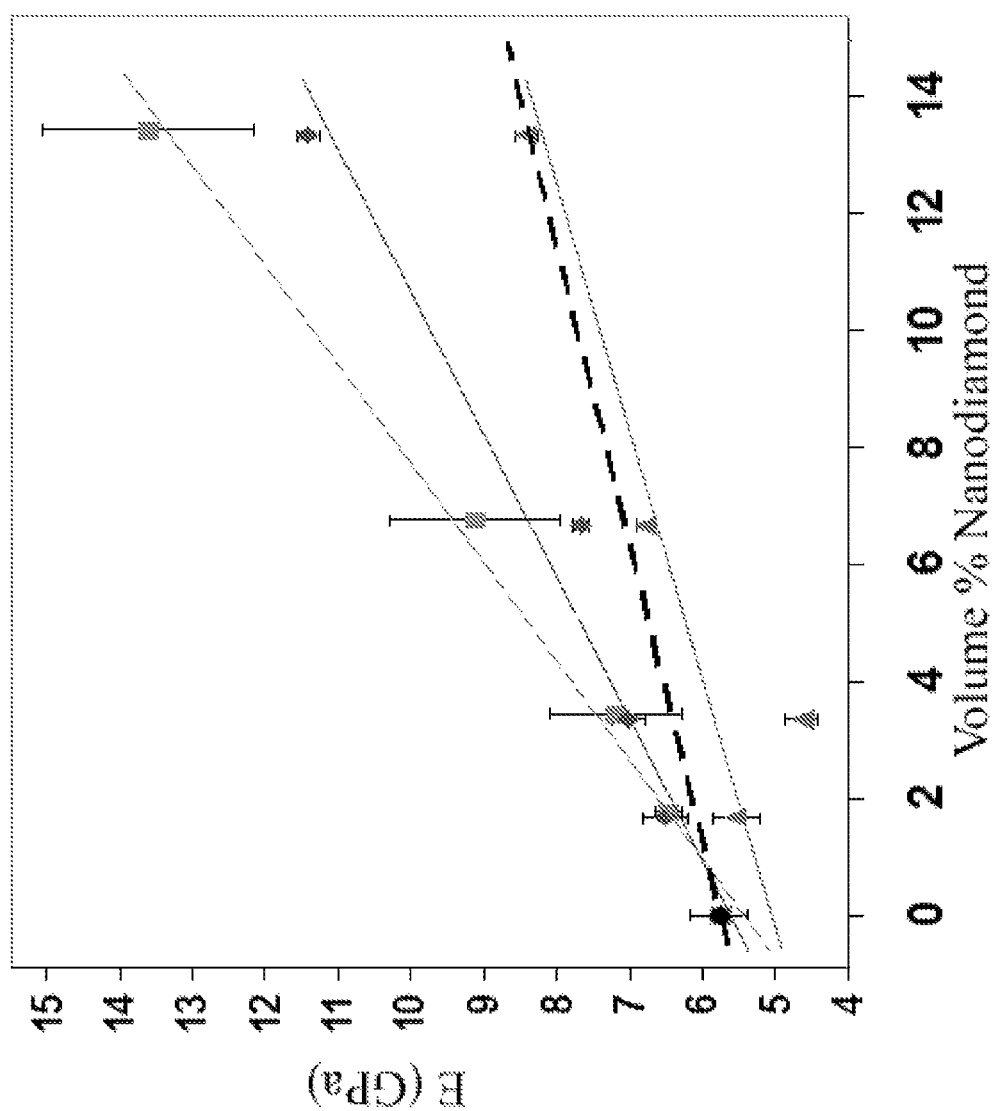
FIG. 3 shows nanoindentation measurements of oxidized aggregated diamond nanoparticle PAN films, oxidized deaggregated diamond nanoparticle PAN films, and unoxidized deaggregated diamond nanoparticle PAN films.

As evidenced by the data in FIG. 3, the oxidized samples have much higher elastic moduli, most likely due to favorable bonding conditions between the carboxylate functional groups on the surface of the nanodiamonds and the nitrile groups of the PAN matrix. While it may be expected that the oxidized ND/PAN films would show a greater increase in elastic modulus than the oxidized UDD/PAN films, because the ND particles are smaller and presumably better distributed, the oxidized UDD/PAN actually measured consistently higher elastic moduli. In view of the additional measurements presented below, however, it is likely that this result was an artifact of the averaging done by the nanoindentor. In fact, the oxidized ND/PAN films do have higher bulk elastic moduli than the oxidized UDD/PAN films (below), but the elastic modulus of an UDD aggregate (e.g., not in matrix) is much greater than either film. That is, nanoindentation is a materials characterization technique that takes a series of highly localized measurements and averages those measurements. When the nanoindenter probe tip encounters pockets of aggregated nanodiamond (in the case of UDD), the probe is measuring the modulus of the aggregate, not the composite. This skews the average modulus data to a higher value than if the same sample were characterized using bulk measurement techniques This interpretation of the nanoindentation data is further supported by the TEM data, below.

Figure 4:
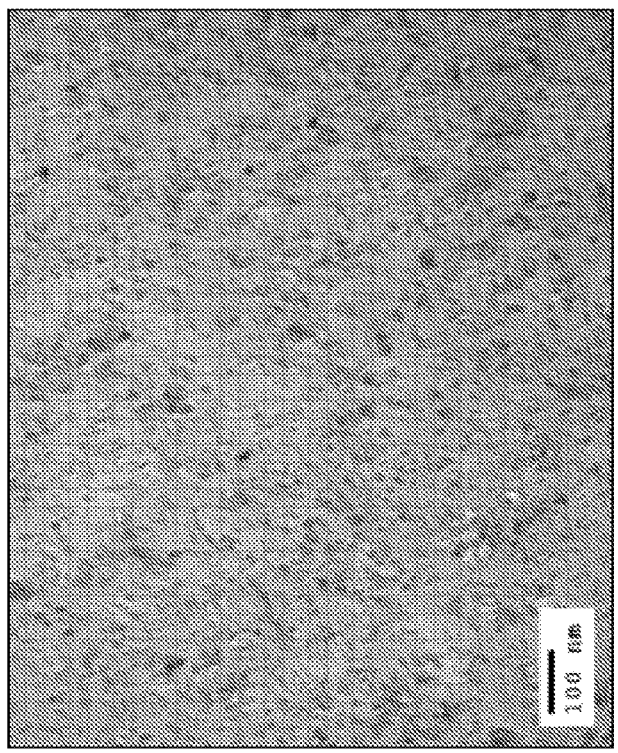
FIG. 4 shows TEM images of a 7% (v/v) oxidized aggregated diamond nanoparticle PAN film (left) and a 7% (v/v) oxidized deaggregated diamond nanoparticle PAN film (right).
Figure 4:
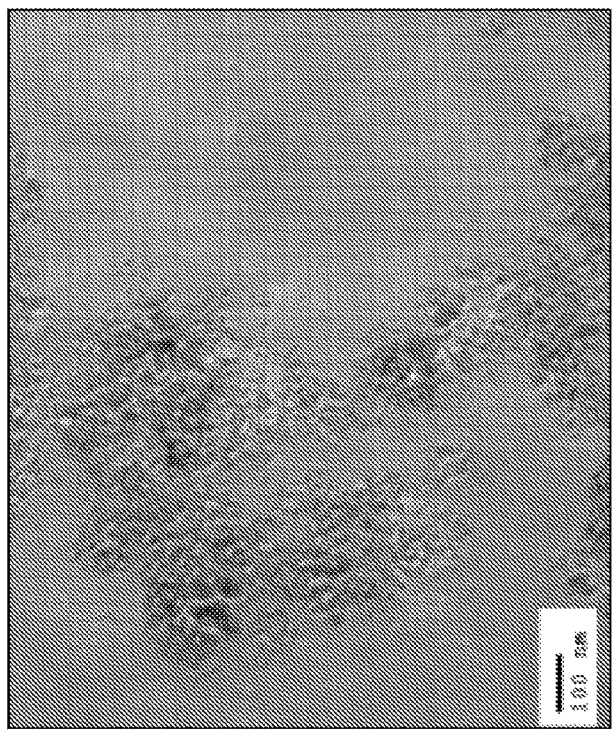
Figure 5:
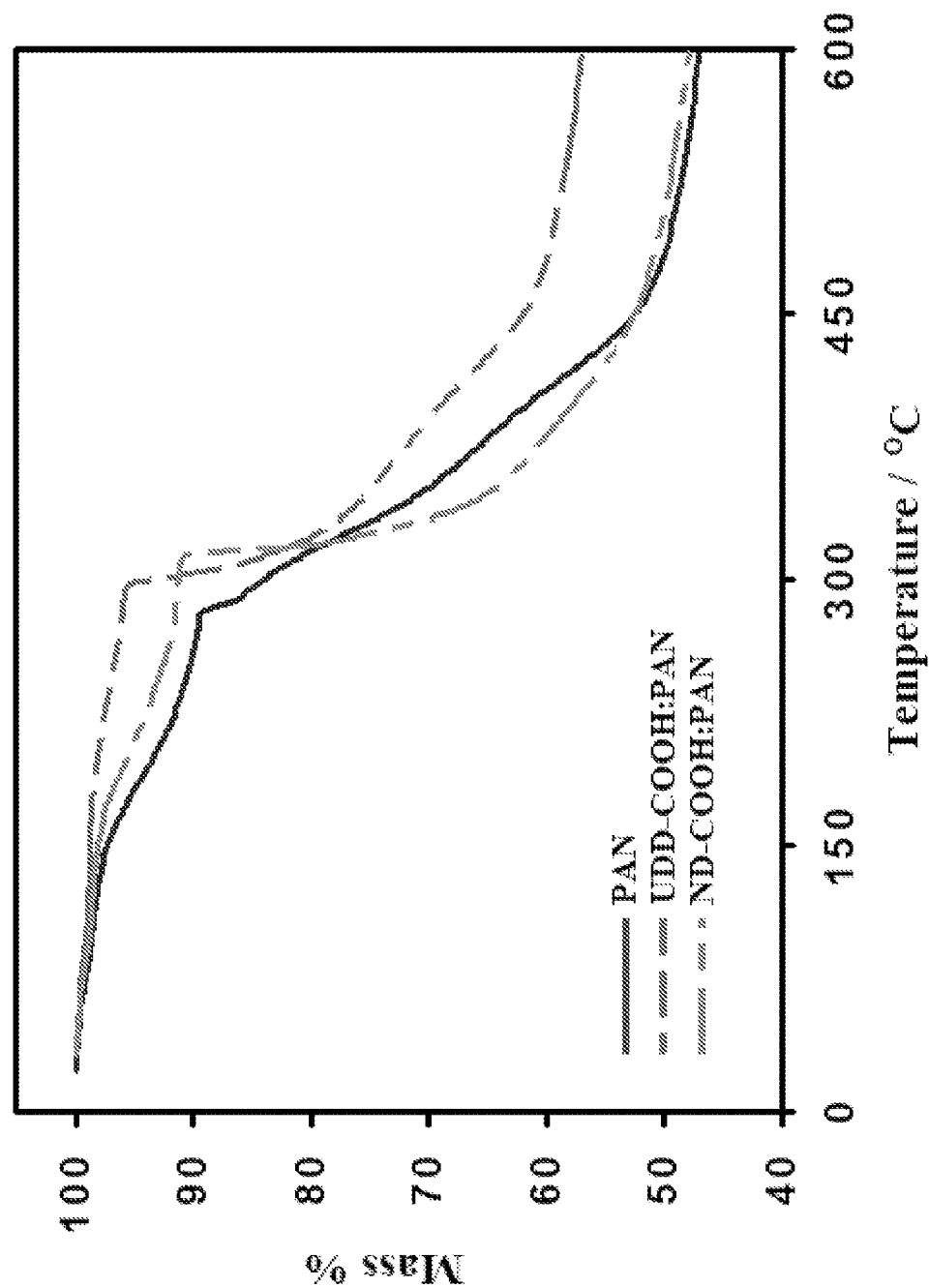
FIG. 5 shows thermal degradation measurements of PAN and oxidized aggregated diamond nanoparticle PAN films and oxidized deaggregated diamond nanoparticle PAN films.

In a second set of tests, the surface morphology and degradation of oxidized ND/PAN and UDD/PAN films was evaluated. Films comprising approximately 7% by volume ND or UDD were prepared by starting from the ND-COOH: DMSO solution or the UDD-COOH slurry of EXAMPLE 1, using the methods above. Once formed, TEM micrographs of the two films (FIG. 4) showed that the ND/PAN film (right) was relatively uniform in morphology, while the UDD/PAN film (left) had large areas of aggregated particles as well large areas of polymer void of nanoparticles (CM-10T electron microscope, Phillips Corporation, Eindhoven, The Netherlands). It was also noted that the dispersed nanodiamond (ND) composites were transparent, while the composites filled with aggregated nanodiamond (UDD) were opaque. Surprisingly, the ND films were significantly more difficult to re-dissolve than PAN films without nanodiamond particles. The PAN films dissolved in DMSO within a few hours, while the ND composites did not dissolve after several weeks of submersion in DMSO. Additionally, thermal analysis showed that the ND/PAN films did not experience thermal degradation until approximately 330° C., about 10% higher temperature than the PAN film, alone (see FIG. 5).

Figure 6:
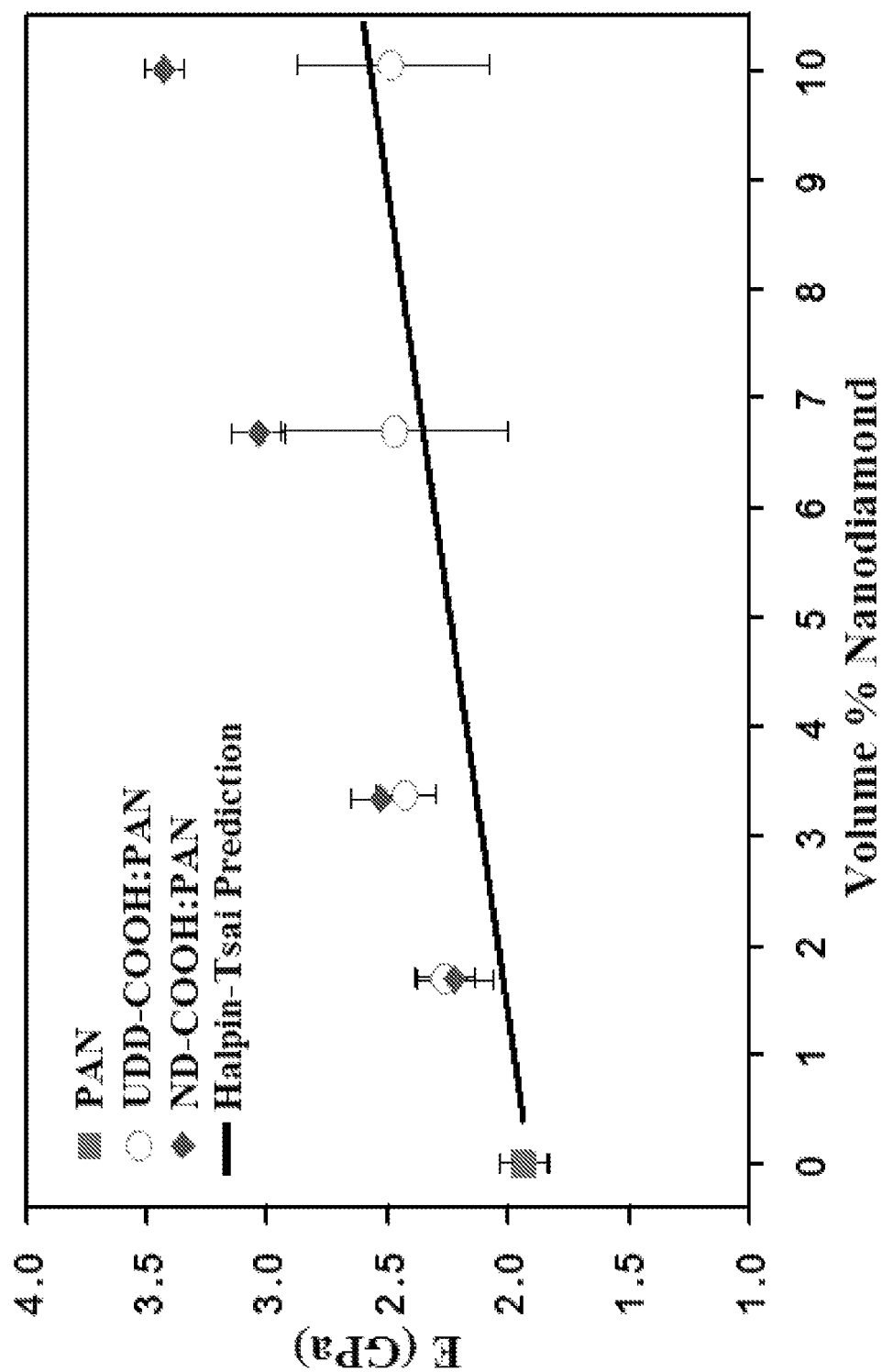
FIG. 6 shows modulus of elasticity measurements for PAN as well as oxidized aggregated diamond nanoparticle PAN films and oxidized deaggregated diamond nanoparticle PAN films of various percent composition nanoparticles.
Figure 7:
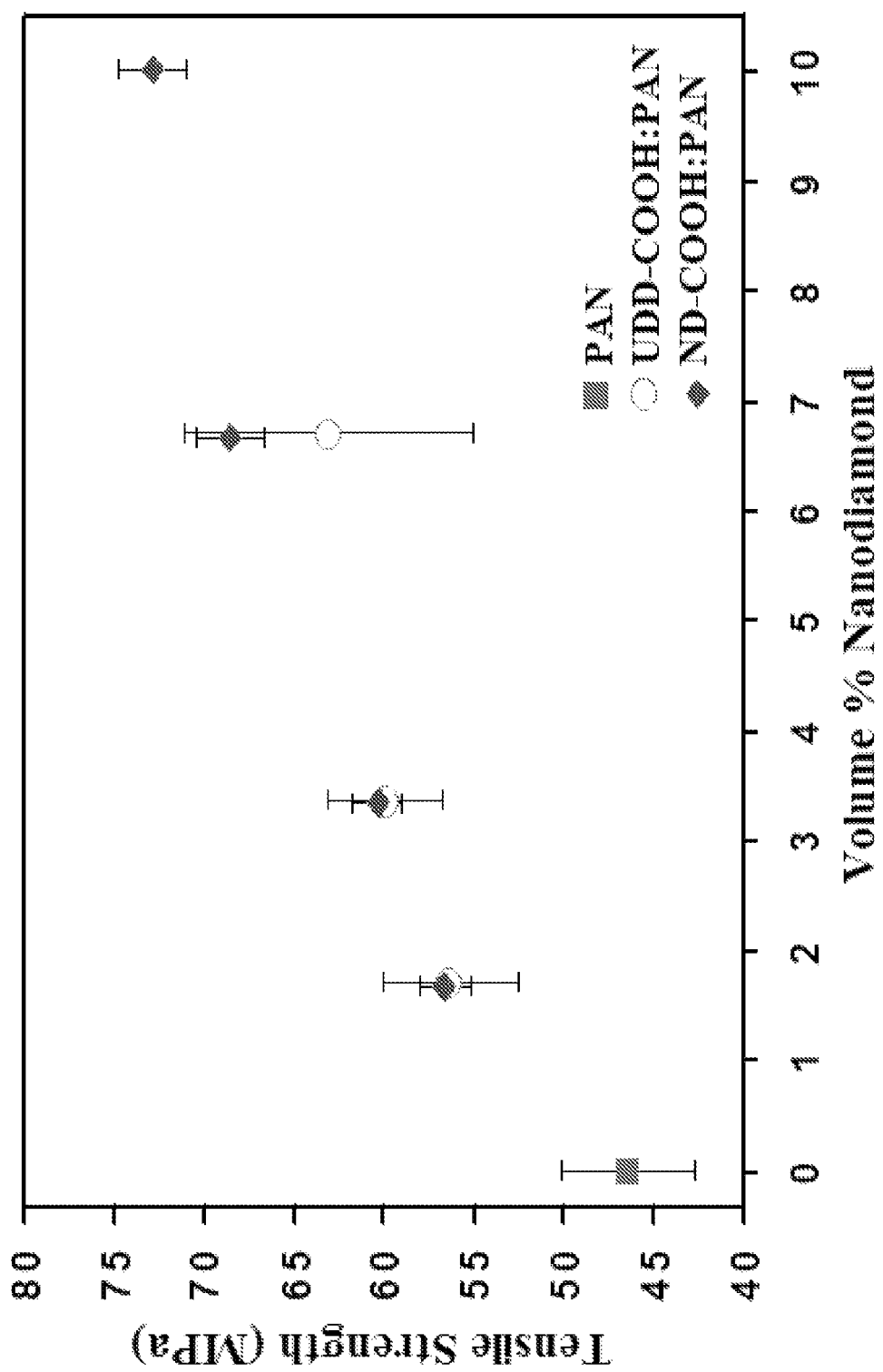
FIG. 7 shows tensile strength measurements for PAN as well as oxidized aggregated diamond nanoparticle PAN films and oxidized deaggregated diamond nanoparticle PAN films of various percent composition nanoparticles.

In a third set of tests, a number of oxidized ND/PAN and UDD/PAN films were prepared to evaluate the mechanical properties via bulk sampling methods. ND/PAN films with approximately 2%, 3%, 7%, and 10% nanoparticles (v/v) were prepared using the methods described above. UDD/PAN films were also prepared with the same volume percentage of nanoparticles. Each film was then diced for the purpose of making several mechanical measurements. The modulus of elasticity, tensile strength, and strain-to-failure of each film were then quantified using a tabletop load frame (MTS model 631, MTS Instruments, Eden Prairie, Minn.). The modulus data is presented in FIG. 6, the tensile strength data is presented in FIG. 7, and the strain-to-failure data is presented in FIG. 8; squares=neat PAN film, circles=UDD/PAN films, and diamonds=ND/PAN films. Predictions from the Halpin-Tsai equations (solid line) are also provided for reference in the modulus data.

In contrast to the nanoindentation data, the load frame data consistently shows that the ND/PAN composites outperform the UDD/PAN composites, especially at higher % composition. For example, the modulus data shows a linearly increasing modulus with added ND nanoparticles, while additional UDD particles actually results in a decreased modulus at high loadings, likely due to the aggregated particles interfering with the integrity of the polymer matrix. Remarkably, at 10 volume percent ND particle loading the data show a nearly 80 percent increase in the elastic modulus over the neat PAN polymer, and a tensile strength enhancement of nearly 60 percent. Because the incorporation of nanodiamonds does not result in a significant increase in weight for the composite, this data suggests that composites comprising deaggregated diamond nanoparticles may be useful in most applications requiring a high strength-to-weight ratio.

Figure 8:
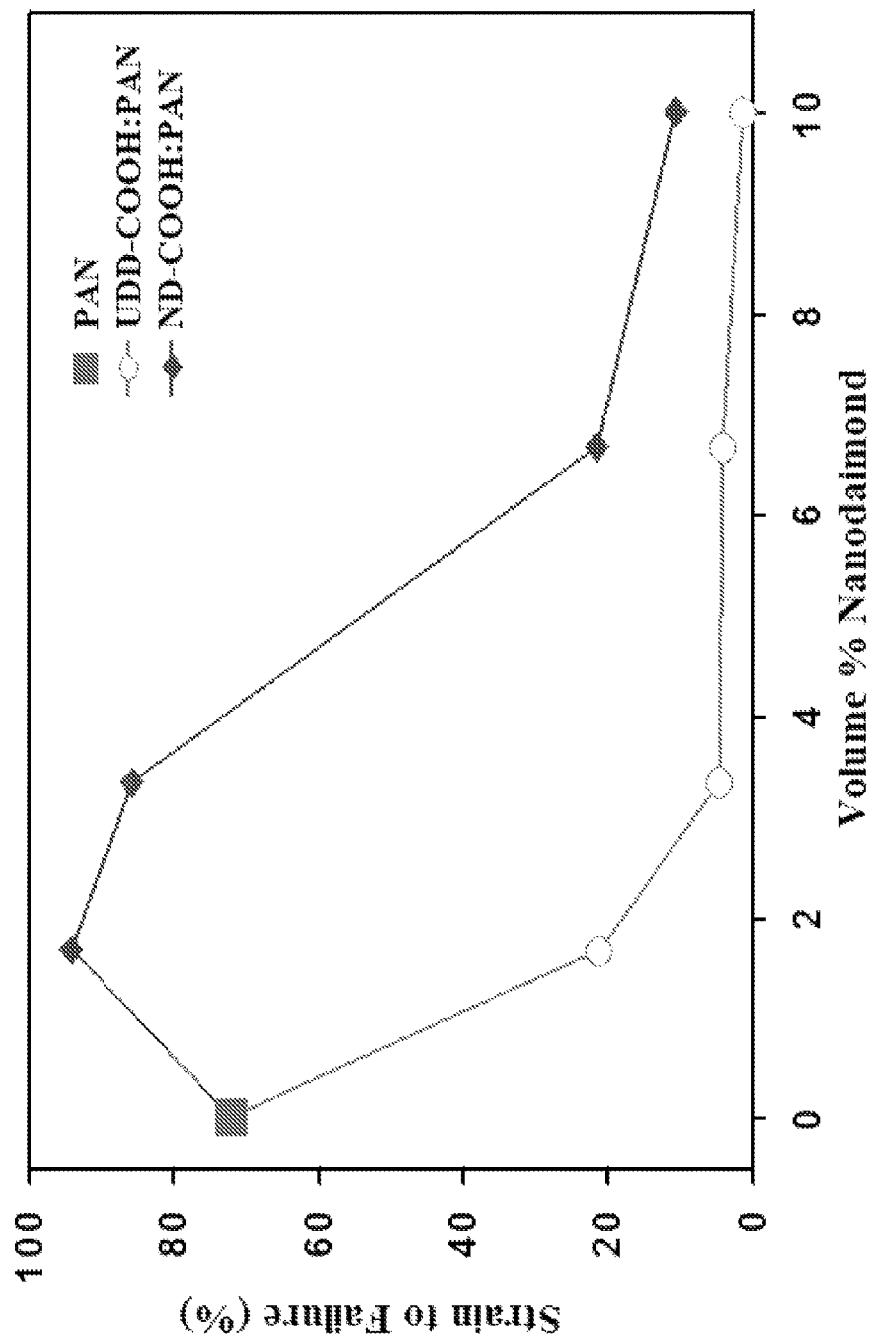
FIG. 8 shows strain-to-failure measurements for PAN as well as oxidized aggregated diamond nanoparticle PAN films and oxidized deaggregated diamond nanoparticle PAN films of various percent composition nanoparticles.

Looking at the strain to failure data in FIG. 8, it is clear that the failure mode for the aggregated and dispersed nanodiamond composites is markedly different. The addition of even low concentration of aggregated filler results in composites that fail after very little strain. In the case of the dispersed nanodiamond, the 2 and 3 volume percent samples are able to sustain more strain than the neat polymer before fracturing. Even at the highest ND particle loading, the dispersed nanocomposite strained more than 10 percent prior to fracture, which is approximately an order of magnitude more strain than the aggregated nanodiamond composite endured at the same concentration.

While not wishing to be bound by theory, it is hypothesized that the UDD aggregates are sufficiently large to inhibit the PAN polymer chains from significantly rearranging, thereby limiting the ductility of the composite, whereas the smaller ND particles allow the polymer chains to change conformation and retain most of the ductility observed in the bulk polymer. Additionally, it is possible that the UDD aggregates, which are highly defective, are acting as crack initiation points. A high defect density results in brittle fractures. Accordingly, amorphous polymeric materials, such as the ND/PAN films, should be able to sustain significant deformations without fracturing because the polymer chains can rearrange their conformation prior to the breaking of covalent bonds.

Example 3

Polymethyl Methacrylate (PMMA) Composite Comprising Deaggregated Diamond Nanoparticles In a 10 mL centrifuge tube, 0.3 g of poly(methyl)methacrylate (PMMA) resin (Scientific Polymer Products) was dissolved in 2.72 g DMSO (Fisher Scientific) to create a PMMA/DMSO solution. To the PMMA/DMSO solution, 1.63 g of the ND-COOH:DMSO solution of EXAMPLE 1 was added to create an ND/PMMA mixture. The centrifuge tube was sealed and placed on rotisserie for two hours to mix. After mixing, the ND/PMMA mixture was cast onto a glass plate. The plate was placed in a vacuum oven at 90° C. for 9 hours to drive off solvent. While in the oven, the mixture formed a composite film approximately 20% by weight ND, dispersed in PMMA.

Figure 9:
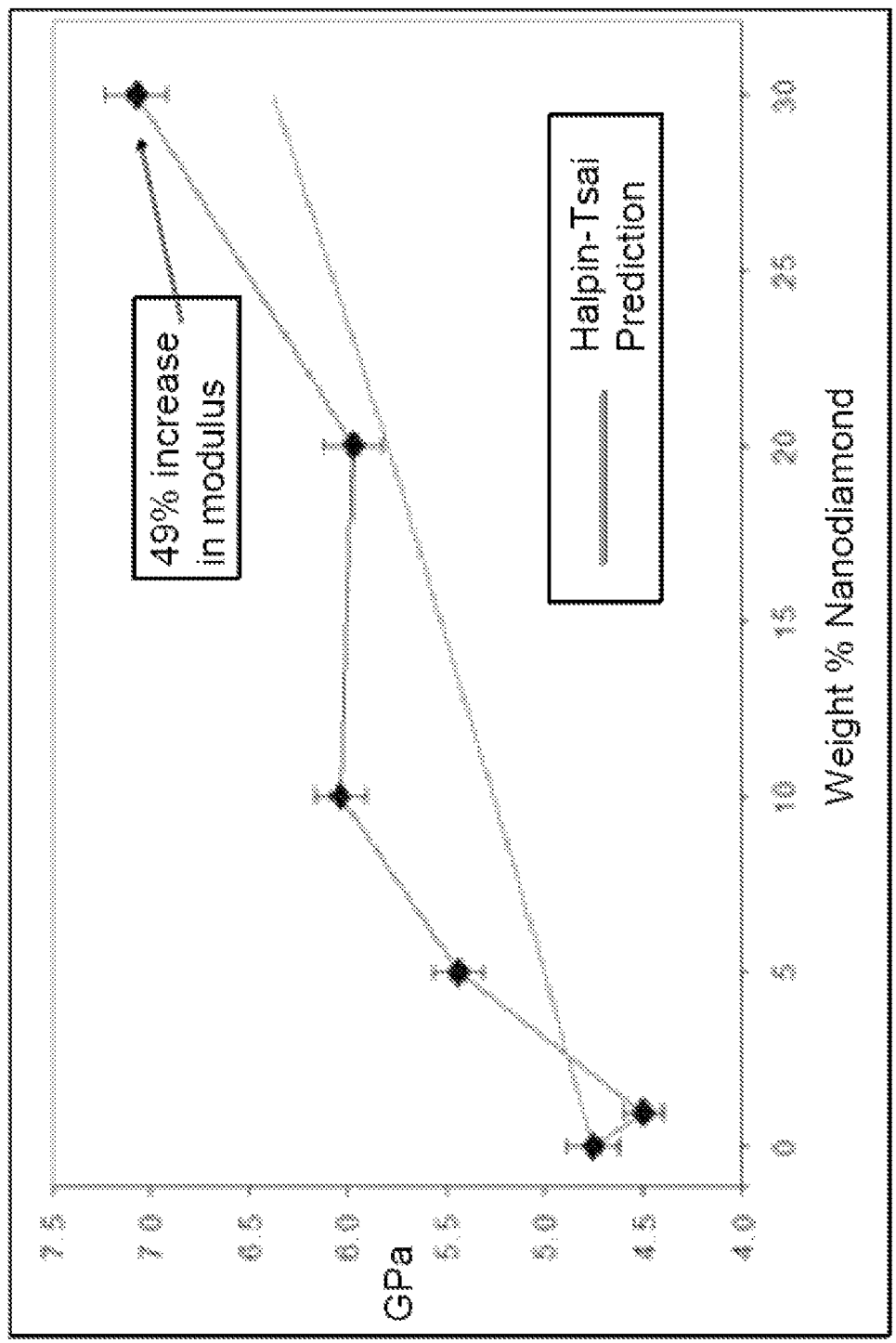
FIG. 9 shows nanoindentation data for a number of PMMA films comprising various percent composition of oxidized deaggregated diamond nanoparticles.

PMMA films with varying weight percent deaggregated diamond nanoparticles were prepared by varying the amount of the ND-COOH:DMSO solution added to the PMMA/DMSO solution, using the above protocol. For nanoindentation tests, 1%, 5%, 10%, 20%, and 30% (wt/wt film) films were prepared, and the films evaluated with a nanoindentor (Nanolndentor G200, Agilent Technologies). The nanoindentation data is shown in FIG. 9. As shown in FIG. 9, the ND/PMMA films showed significant enhancement in modulus of elasticity as a function of weight percent of deaggregated diamond nanoparticles in the film. For the sake of comparison, the experimental results are presented along with the predictions of the Halpin-Tsai equations, which assume the nanodiamond particles are spherical, and have a Young's modulus of 1 TPa. Again, the experimental data outperforms the values predicted by the Halpin-Tsai equations, likely due to carboxylate interactions between the monomers and the ND particles. The variance from a smooth line for the 1% and 20% films may have been due to these films having higher concentrations of residual DMSO, which was confirmed with thermogravimetric analysis (TGA) (not shown).

Example 4

Aqueous Deaggregated Diamond Nanoparticle Glycidol Solution

Approximately 4 g of UDD-COOH (EXAMPLE 1) was mixed with 100 mL of glycidol (oxirane-2-methanol, Sigma-Aldrich, St. Louis, Mo.) and sonicated for 1 hour to create a UDD-COOH slurry. The UDD-COOH slurry was then agitated with approximately 50 mL of 50 μm zirconia beads (Sigma Aldrich) for approximately 30 minutes to deaggregate the UDD-COOH to form deaggregated nanodiamond particles (ND-COOH). After agitation, the supernatant containing the ND-COOH was poured away from the zirconia beads and into a 200 mL round bottom flask. A magnetic stirrer was added to the flask, and the mixture was stirred in a 50° C. oil bath for 2 hours. The solution was allowed to return to room temperature, and was then transferred to a dialysis bag. The dialysis bag containing the mixture was placed in a 2 L beaker containing DI water. The DI water was replaced every 12 hours for 4 days. After four days, the mixture has been converted to a 4.0 weight percent aqueous solution of ND-COOH with surface oligomers of gylcidol (ND/glycidol/water). Using this technique, it is possible to prepare aqueous deaggregated diamond nanoparticle glycidol solutions with up to 6% deaggregated diamond nanoparticles (wt/wt solution). Remarkably there is no measurable change in viscosity from 1 to 6% deaggregated diamond nanoparticles (wt/wt solution).

Example 5

Deaggregated Diamond Nanoparticles Surface Derivatized with 3,4'-Oxydianiline Amidyl Moieties To approximately 10 mL of ND-COOH:DMSO solution of EXAMPLE 1 was added approximately 0.6 g of dicyclohexylcarbodiimide (Sigma-Aldrich). The reaction solution was stirred under an inert atmosphere at room temperature (2-24 hours), and then approximately 0.4 g of 3,4'-oxydianiline (Sigma-Aldrich) was added, and the resulting reaction medium was stirred for an additional period (>24 hours). A product was precipitated by addition of ethanol (approximately 20 mL) and then isolated by centrifugation at approximately 3500 revolutions per minute for 20 minutes. The product solid was washed sequentially with 25 mL portions of dimethylforamide, ethanol, acetone, and diethyl ether and then dried under a flow of nitrogen gas. FTIR spectral data showed a significant change in carbonyl stretching band peak intensities consistent with amide formation, and TGA mass loss curves showed approximately 4 mass % loss over the temperature range of approximately 250° C.-650° C. consistent with thermal decomposition of covalently bound 3,4'-oxydianiline amidyl surface moieties.

Example 6

Polyethylene Glycol (PEG) Composite Comprising Deaggregated Diamond Nanoparticles In a 15 mL centrifuge tube, 1.25 g of 1500 molecular weight polyethylene glycol (PEG) (Scientific Polymer Products) was dissolved in 6.0 mL of DI water to create an aqueous PEG solution. To the aqueous PEG solution, 7.8 g of the ND/glycidol/water solution of EXAMPLE 4 was added to create an ND/PEG mixture. The centrifuge tube was sealed and placed on a rotisserie for four hours to mix. After mixing, the ND/PEG mixture was cast onto a glass plate. The plate was placed in a vacuum oven at 60° C. for 8 hours to drive off the water. While in the oven, the mixture formed a composite film approximate 20% by weight ND, dispersed in PEG. The ND:PEG composite was heated to melting and recast four times without losing its transparency, indicating that the thermoplastic composite was maintaining a good dispersion despite thermal cycling.

Example 7

Epoxy Resin Composite Comprising Deaggregated Diamond Nanoparticles

Approximately 3 g of UDD-COOH (EXAMPLE 1) was mixed with 97 g of an epichlorohydrin-dipropylene glycol epoxy resin (D.E.R. 736, Dow Chemical, Midland, Mich.) and sonicated for 30 minutes to create a UDD-COOH/epoxy slurry. The UDD-COOH/epoxy slurry was then agitated with approximately 50 mL of 50 μm zirconia beads (Sigma Aldrich) for approximately 30 minutes to deaggregate the UDD-COOH to form deaggregated nanodiamond particles (ND-COOH). After agitation, the supernatant containing the ND-COOH/epoxy solution was poured away from the zirconia beads to produce a 3% ND/D.E.R. 736 resin.

Figure 10:
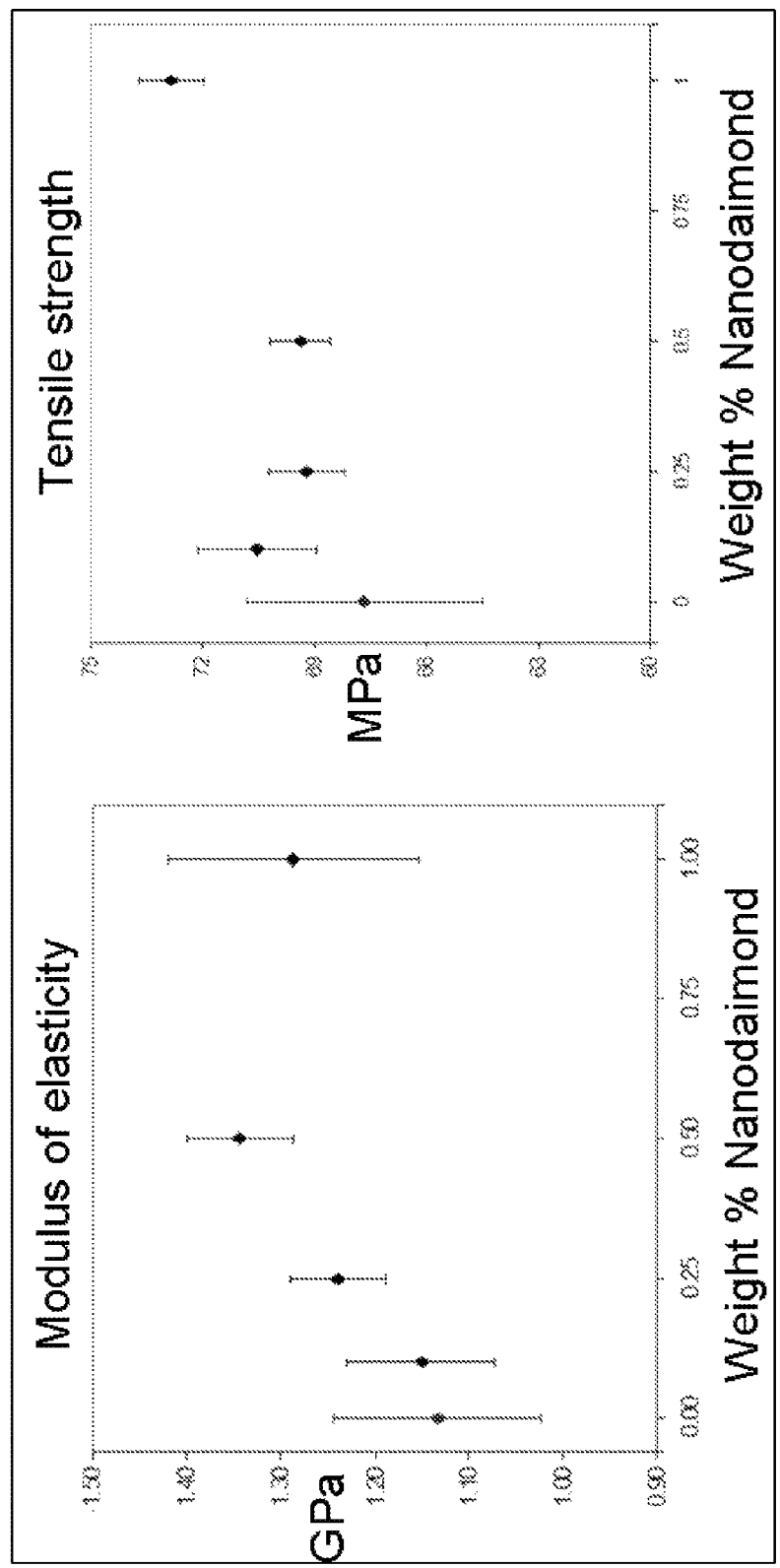
FIG. 10 shows modulus of elasticity (a) and tensile strength (b) data for a number of epoxy films comprising various percent composition of oxidized deaggregated diamond nanoparticles.

The 3% ND/D.E.R. 736 resin was cut in half with an equal volume of epichlorohydrin-bisphenol A epoxy resin (D.E.R. 331, Dow Chemical, Midland, Mich.), to create a 1.5% ND/D.E.R. 736/331 resin. From the 1.5% solution, a series of diluted ND/D.E.R. 736/331 resin samples were prepared, so that the resultant resin samples had 0.1%, 0.25%, 0.5%, and 1% ND-COOH (wt/wt). A control of neat 736/331 resin, without ND-COOH, was also prepared. Each sample was cast onto a glass plate, degassed for 1 hour, cured at room temperature for 12 hours, and then post cured at 90° C. for 2 hours. Once cured, each film was peeled away from the glass plate and evaluated using the ASTM D 638 method on a tabletop load frame (MTS 651, MTS Instruments). As can be seen in FIG. 10, the modulus of elasticity of the resultant film increased as a function of the concentration of deaggregated diamond nanoparticles in the film. Additionally, the tensile strength of the film roughly increased as a function of the concentration of deaggregated diamond nanoparticles.

Example 8

Surface-Functionalized deaggregated diamond nanoparticle epoxy composite

Approximately 2.5 g of UDD-COOH (EXAMPLE 1) was mixed with 2.0 mL of (3-glycidyloxypropyl) trimethoxysilane (GTMS) (Sigma-Aldrich) and 100 mL of DMF (Sigma-Aldrich) in a 200 mL flask and sonicated for 30 minutes to create a UDD-COOH slurry. The UDD-COOH slurry was then agitated with approximately 50 mL of 50 μm zirconia beads (Sigma Aldrich) for approximately 30 minutes to deaggregate the UDD-COOH to form deaggregated nanodiamond particles (ND-COOH). After agitation, the supernatant containing the ND-COOH was poured away from the zirconia beads.

Approximately 2 mL of ND-GTMS:DMF solution was combined with 7 g of Part A of a cycloaliphatic amine epoxy resin (SC-15, Applied Poleramic, Benicia, Calif.) in a 15 mL test tube. The tube was sealed with a rubber septa and placed on a rotisserie for 4 hours to mix. The resultant Part A/ND-GTMS:DMF solution was cast into a 140 mm diameter glass Petri dish (Fisher Scientific) and the DMF allowed to evaporate at ambient pressure for 16 hours. The resultant ND-GTMS:SC15 resin was then combined with the corresponding part B resin (SC-15, Applied Poleramic) at a ratio of 10:3 (Part A:Part B). The Part A/Part B mixture was then cast onto a glass plate, degassed for 1 hour, cured at room temperature for 12 hours, and then post cured at 90° C. for 2 hours. After the film had cured, it was removed from the plate and evaluated. FTIR analysis indicated that the deaggregated diamond nanoparticles were functionalized with (3-glycidyloxypropyl) trimethoxysilane.

Example 9

Vinyl Ester Composite Comprising Deaggregated Diamond Nanoparticles

Approximately 2.5 g of UDD-COOH (EXAMPLE 1) was mixed with 2.0 mL of vinyltrimethoxysilane (VTMS) (Sigma-Aldrich) and 95.5 g of styrene (Sigma-Aldrich) in a 200 mL flask and sonicated for 1 hour to create a UDD-COOH slurry. The UDD-COOH slurry was then agitated with approximately 50 mL of 50 μm zirconia beads (Sigma Aldrich) for approximately 30 minutes to deaggregate the UDD-COOH to form deaggregated nanodiamond particles (ND-COOH). After agitation, the supernatant containing the ND-COOH was poured away from the zirconia beads.

Approximately 10 grams of bisphenol A epoxy vinyl ester resin formulation (Derakane VE 411-350, Ashland Industries, Covington, Ky.) was placed in a large Petri dish and evaporated for 8 hours in a vacuum oven at 35° C. to drive off the styrene in the formulation (approximately 45% styrene content). After evaporation, the remaining bisphenol A epoxy vinyl ester resin (approximately 5 grams) was combined with 5 g of the ND-VTMS:styrene solution created above. Methylethyl ketone peroxide (0.2 mL) was then added to the resin solution, the mixture cast onto a glass plate, and cured at room temperature for 24 hours. After the film had cured, it was removed from the plate and evaluated. FTIR analysis indicated that the deaggregated diamond nanoparticles were functionalized with vinyltrimethoxysilane.

Example 10

Thermal Conductivity of an Ethylene Glycol Solution Comprising Deaggregated Diamond Nanoparticles Approximately 100 g of the 4% aqueous deaggregated diamond nanoparticle glycidol solution of EXAMPLE 4 was mixed with 100 g of ethylene glycol (Sigma Aldrich) in a 500 mL round bottom flask (Fisher Scientific). The mixture was sonicated for 30 minutes, and then rotationally evaporated at 100° C. to remove the water. The resulting ethylene glycol solution contained approximately 4% (wt/wt solution) of deaggregated diamond nanoparticles surface functionalized with oligomers of gylcidol (ND:ethylene glycol solution).

Figure 11:
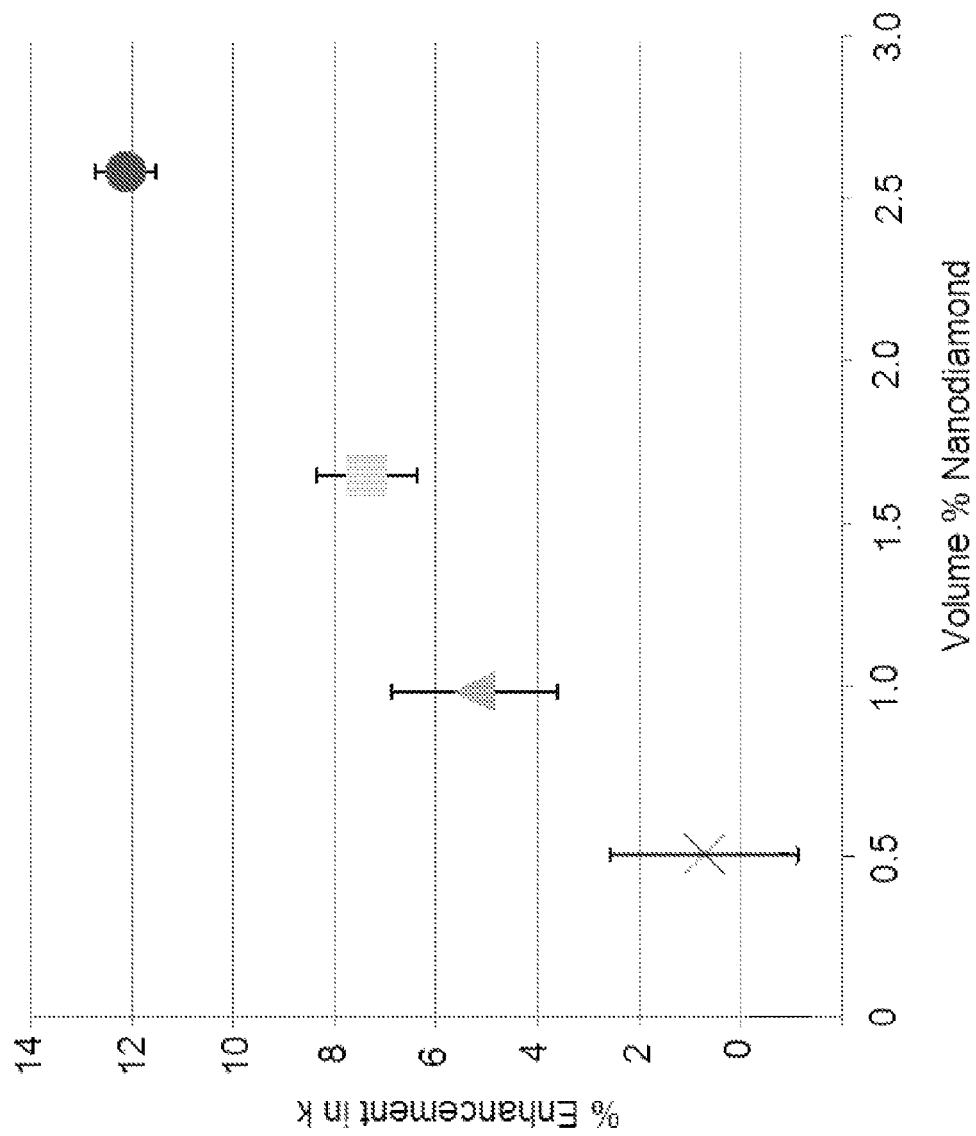
FIG. 11 shows thermal conductivity data for ethylene glycol solutions comprising varying amounts of oxidized deaggregated diamond nanoparticles.

The 4% ND:ethylene glycol solution was serially diluted with ethylene glycol to produce solutions of approximately 0.5%, 1.0%, 1.5%, and 2.5% (v/v solution). The thermal conductivity of each solution was then evaluated using a thermal conductivity analyzer (KD2 Pro Thermal Analyzer, Decagon Devices, Pullman, Wash.). The enhancement in thermal conductivity, as compared to ethylene glycol, is shown graphically in FIG. 11. As shown in FIG. 11, the thermal conductivity of the ethylene glycol solutions increases with increasing concentration of deaggregated diamond nanoparticles.

Example 11

Thermal Conductivity of a Mineral Oil Solution Comprising Deaggregated Diamond Nanoparticles Approximately 4 g of UDD-COOH (EXAMPLE 1) was mixed with 6.0 mL of oleic acid (Sigma-Aldrich) and 100 g of octane (Sigma-Aldrich) in a 250 mL round-bottom flask and sonicated for 1 hour to create a UDD-COOH slurry. The UDD-COOH slurry was then agitated with approximately 50 mL of 50 μm zirconia beads (Sigma Aldrich) for approximately 30 minutes to deaggregate the UDD-COOH to form deaggregated nanodiamond particles (ND-COOH). After agitation, the supernatant containing the ND-COOH was poured away from the zirconia beads into a 500 mL round-bottom flask to which 90.5 g of light mineral oil (Sigma Aldrich) was added. The ND:octane:mineral oil mixture was then rotationally evaporated at 120° C. to drive off the octane. The final ND:mineral oil mixture was approximately 4% (wt/wt solution) deaggregated diamond nanoparticles in mineral oil.

Figure 12:
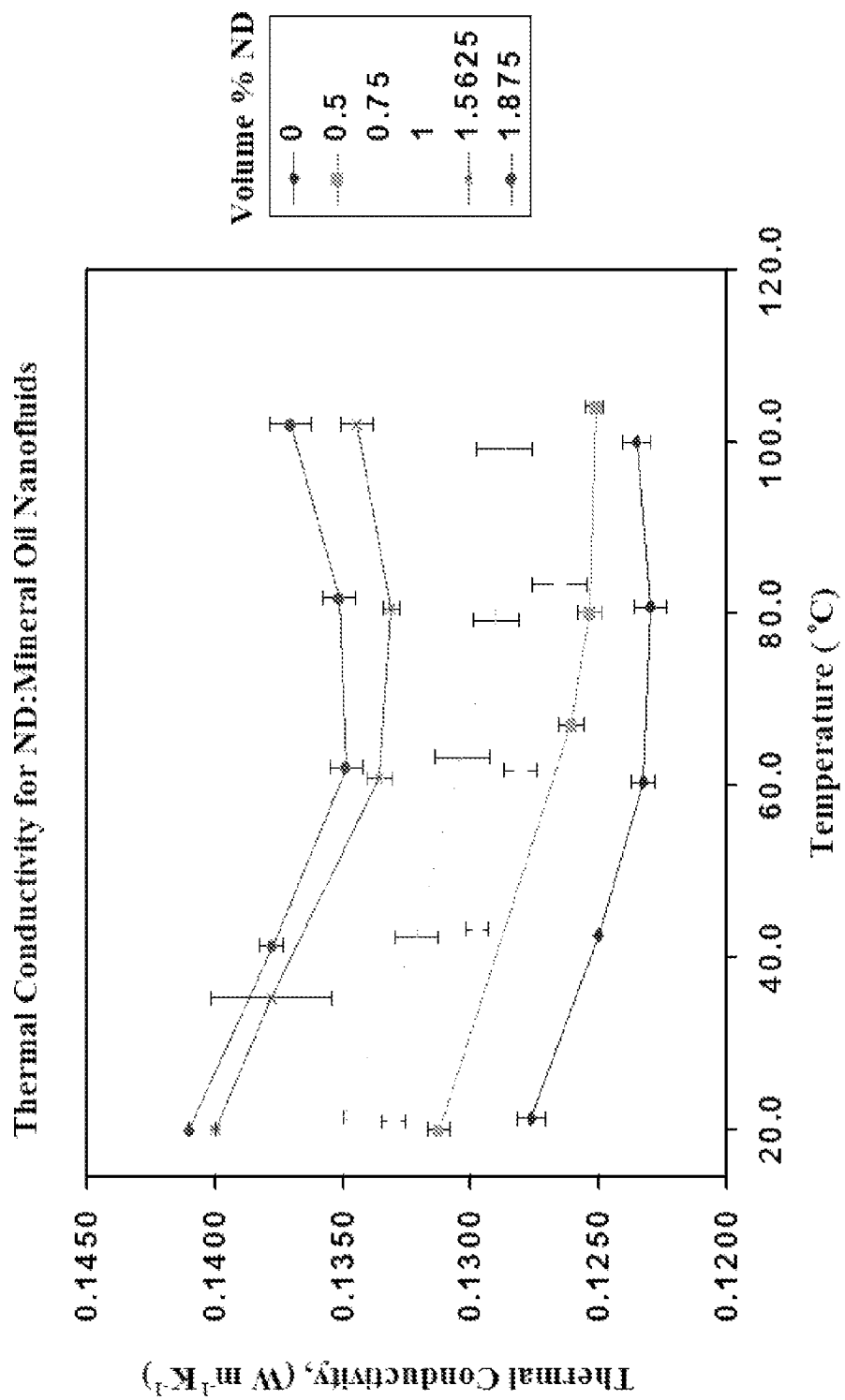
FIG. 12 shows thermal conductivity data for mineral oil solutions comprising varying amounts of oxidized deaggregated diamond nanoparticles.

The 4% ND: mineral oil solution was serially diluted with additional mineral oil to produce solutions of approximately 0.5%, 0.75%, 1.0%, 1.5%, and 2% (v/v solution). The thermal conductivity of each solution was then evaluated using a thermal conductivity analyzer (KD2 Pro Thermal Analyzer, Decagon Devices) as a function of the temperature of the solution. The enhancement in thermal conductivity, as compared to pure mineral oil, is shown graphically in FIG. 12. As shown in FIG. 12, the thermal conductivity of the mineral oil solutions increases with increasing concentration of deaggregated diamond nanoparticles. The thermal conductivity of the mineral oil solutions also decreases with increasing temperature over the range of 20° C. to 60° C.

Remarkably, the ND: mineral oil solutions are stable for at least months at a time, not coming out of solution despite repeated heating and cooling cycles.

Example 12

Tribological Properties Of A Mineral Oil Solution Comprising Deaggregated Diamond Nanoparticles Approximately 4 g of UDD-COOH (EXAMPLE 1) will be mixed with 6.0 mL of oleic acid (Sigma-Aldrich) and 100 g of octane (Sigma-Aldrich) in a 250 mL round-bottom flask and sonicated for 1 hour to create a UDD-COOH slurry. The UDD-COOH slurry will then be agitated with approximately 50 mL of 50 µm zirconia beads (Sigma Aldrich) for approximately 30 minutes to deaggregate the UDD-COOH to form deaggregated nanodiamond particles (ND-COOH). After agitation, the supernatant containing the ND-COOH will be poured away from the zirconia beads into a 500 mL round-bottom flask to which 90.5 g of light mineral oil (Sigma Aldrich) will be added. The ND:octane:mineral oil mixture will then rotationally evaporated at 120° C. to drive off the octane. The final ND:mineral oil mixture will be approximately 4% (wt/wt solution) deaggregated diamond nanoparticles in mineral oil.

The mineral oil masterbatch solution will be diluted with additional mineral oil to form solutions of 0.1%, 0.5%, 1.0%, 1.5%, 2.0%, 2.5%, 3.0%, 4.0%, 5.0% (wt/wt solution) deaggregated diamond nanoparticles in mineral oil. The tribological properties will be tested using a pin-on-disk apparatus according to ASTM G99, Standard Test Method for Wear Testing with a Pin-on-Disk Apparatus.

All patents, publications and references cited herein are hereby fully incorporated by reference. In case of conflict between the present disclosure and incorporated patents, publications and references, the present disclosure should control.

The invention claimed is:

1. A heat-transfer fluid comprising deaggregated diamond nanoparticles, the deaggregated diamond nanoparticles having an average particle size of less than about 10 nm.

2. The heat-transfer fluid of claim 1, wherein the deaggregated diamond nanoparticles are oxidized.

3. The heat-transfer fluid of claim 1, wherein the heat transfer fluid comprises at least one of ethylene glycol, mineral oil, dimethyl polysiloxane, a biphenol, a triphenol, or a combination thereof.

4. The heat-transfer fluid of claim 1, wherein the heat transfer fluid comprises greater than about 1% (wt/wt) deaggregated diamond nanoparticles.

5. The heat-transfer fluid of claim 3, wherein the heat transfer fluid comprises greater than about 3% (wt/wt) deaggregated diamond nanoparticles.

6. The heat-transfer fluid of claim 1, wherein the fluid is shelf-stable for at least about 30 days.

7. A lubricating fluid comprising deaggregated diamond nanoparticles, the deaggregated diamond nanoparticles having an average particle size of less than about 10 nm.

8. The lubricating fluid of claim 7, wherein the deaggregated diamond nanoparticles are oxidized.

9. The lubricating fluid of claim 7, wherein the lubricating fluid comprises at least one of ethylene glycol, mineral oil, dimethyl polysiloxane, hydrocarbons, or a combination thereof.

10. The lubricating fluid of claim 7, comprising greater than about 1% (wt/wt) deaggregated diamond nanoparticles.

11. The lubricating fluid of claim 10, comprising greater than about 3% (wt/wt) deaggregated diamond nanoparticles.

12. The lubricating fluid of claim 7, wherein the fluid is shelf-stable for at least about 30 days.

13. A method of increasing the thermal conductivity of a fluid, comprising incorporating deaggregated diamond nanoparticles into the fluid, the deaggregated diamond nanoparticles having an average particle size of less than about 10 nm.

14. The method of claim 13, wherein the deaggregated diamond nanoparticles are oxidized.

15. The method of claim 13, wherein the thermal conductivity is increased by at least about 1% compared to the same fluid without deaggregated diamond nanoparticles.

16. The method of claim 13, wherein the thermal conductivity is increased by at least about 5% compared to the same fluid without deaggregated diamond nanoparticles.

17. The method of claim 13, wherein the thermal conductivity is increased by at least about 10% compared to the same fluid without deaggregated diamond nanoparticles.

18. A method of increasing the lubricity of a fluid, comprising incorporating deaggregated diamond nanoparticles into the fluid, the deaggregated diamond nanoparticles having an average particle size of less than about 10 nm.

19. The method of claim 18, wherein the deaggregated diamond nanoparticles are oxidized.

20. The method of claim 18, wherein the coefficient of friction of the fluid is reduced by at least about 10%.

21. The method of claim 18, wherein the wear rate of the fluid is reduced by at least about 5%.

22. The method of claim 18, wherein the seizure load of the fluid is increased by at least about 10%.

23. A liquid composite comprising deaggregated diamond nanoparticles, the deaggregated diamond nanoparticles having an average particle size of less than about 10 nm.

* * * * *